(12) United States Patent
Petty (10) Patent No.: US 11,414,136 B2
(45) Date of Patent: Aug. 16, 2022

(54) REMOVABLY ATTACHABLE FENDER FLARE TO BE USED AS A RECOVERY BOARD

(71) Applicant: Jon Petty, Saint George, UT (US)

(72) Inventor: Jon Petty, Saint George, UT (US)

( * ) Notice: Subject to any disclaimer, the term of this patent is extended or adjusted under 35 U.S.C. 154(b) by 267 days.

(21) Appl. No.: 16/748,625

(22) Filed: Jan. 21, 2020

(65) Prior Publication Data

US 2020/0231220 A1 Jul. 23, 2020

Related U.S. Application Data

(60) Provisional application No. 62/794,346, filed on Jan. 18, 2019.

(51) Int. Cl.
*B62D 25/18* (2006.01)
*B60B 39/12* (2006.01)

(52) U.S. Cl.
CPC ............ *B62D 25/182* (2013.01); *B60B 39/12* (2013.01); *B62D 25/184* (2013.01); *B60B 2900/721* (2013.01)

(58) Field of Classification Search
CPC .... B62D 25/18; B62D 25/182; B62D 25/184; B62D 25/188; B62D 25/16; B60B 15/00; B60B 15/26; B60B 15/263; B60B 15/266; B60B 39/00; B60B 39/02; B60B 39/12; B60B 2900/721; B60B 2900/551; B60C 27/00
USPC .......................................................... 238/14
See application file for complete search history.

(56) References Cited

U.S. PATENT DOCUMENTS

| | | | | |
|---|---|---|---|---|
| 2,479,760 | A * | 8/1949 | Merrick | B60B 39/12 238/14 |
| 5,402,941 | A * | 4/1995 | MacLeod | B60B 39/12 238/14 |
| 5,538,183 | A * | 7/1996 | McGee | B60B 39/12 238/14 |
| 8,210,443 | B2 * | 7/2012 | Studstill | B60B 39/00 238/14 |
| D700,887 | S * | 3/2014 | Minnis | B60B 39/12 D12/608 |
| 10,759,224 | B2 * | 9/2020 | Joyce | B60B 39/12 |
| 2010/0253034 | A1 * | 10/2010 | Crismon | B62D 25/182 280/154 |
| 2013/0282235 | A1 * | 10/2013 | Kamminga | B60B 39/12 701/36 |

(Continued)

FOREIGN PATENT DOCUMENTS

GB 2310414 A * 8/1997 ........... B62D 25/182

*Primary Examiner* — Zachary L Kuhfuss
*Assistant Examiner* — Cheng Lin
(74) *Attorney, Agent, or Firm* — Gurr Brande & Spendlove, PLLC; Robert A. Gurr (57) ABSTRACT

A removably attachable fender flare system has an inner flare and an upper flare and a lower flare, which are removably attachable to the inner flare. The upper and lower flare may have traction protrusions to provide traction to free a stuck off-road vehicle. The inner flare may be in direct contact with and coupled to the off-road vehicle, providing a location to secure the upper and lower flares. The upper flare and lower flare may couple to a groove, which runs the length of the inner flare, from front to back. Further, the lower flare may couple to the upper flare, securing the fender flares.

16 Claims, 10 Drawing Sheets

(56) References Cited

U.S. PATENT DOCUMENTS

2018/0339552 A1\* 11/2018 Hermans ................. B60C 27/00
2020/0047553 A1\* 2/2020 Harrington ............. B60B 39/12

\* cited by examiner

REMOVABLY ATTACHABLE FENDER FLARE TO BE USED AS A RECOVERY BOARD

CROSS-REFERENCE TO RELATED APPLICATIONS

This application claims the benefit of U.S. Provisional Application Ser. No. 62/794,346, filed on Jan. 18, 2019, which is incorporated herein by reference.

TECHNICAL FIELD

The present disclosure relates to removable fender flares. More specifically, the present disclosure relates to a removably attachable fender flare that can be used as a recovery board when a vehicle is stuck.

BACKGROUND

Many sport utility vehicles and light trucks are well suited for off-road driving as well as highway driving. For certain off-road driving challenges, however, it may be desirable for these vehicles to be customized in order to provide desired performance. Such customizations may include alterations to mechanical systems, such as the vehicle's suspension and transmission, or may include body modifications, such as removal of roof, doors, bumpers, and fenders. The latter group of modifications offers increased driver visibility, obstacle clearance, and wheel mobility, which helps to reduce risk of damage to vulnerable parts of the vehicle.

Some highly customized vehicles become single-use vehicles that are used for recreational purposes only. These are only operated in an off-road location and are typically towed over paved roads to and from the off-road location. Most other vehicles in the aforementioned classification are multi-use, where they must provide daily transportation on paved roads and also provide for occasional off-road excursions. Because these multi-use vehicles are driven on public roadways, they must comply with transportation safety requirements when on these roads. Unfortunately, some safety requirements reduce the ability of the vehicle to successfully navigate over and around some obstacles found off-road and pose a higher risk of damage to those parts while off-road driving. It is therefore desirable to provide for convenient means of configuring a multi-use vehicle for optimal off-road performance, then re-configuring it for compliance with public roadway safety regulations.

Fenders are deployed on motor vehicles to prevent or reduce damage to a motor vehicle, and particularly to a following vehicle by preventing rocks from hitting a following vehicle. Fenders may also be designed to reduce the severity of injury to pedestrians that may come in contact with the moving vehicle by reducing the risk of entanglement with the wheel or of being forced under the vehicle. In many of these functions, particularly the last group, it is advantageous for the fender to extend beyond the vehicle's wheels. Indeed, transportation safety regulations in several locations require fenders to extend to nearly the full width of the tires, so that they shield debris kicked-up by the tires. When driving off-road, however, portions of the fender that extend directly over the vehicle's tires may restrict movement of the vehicle's wheels, or may limit the approach angle of the vehicle, potentially making the vehicle's tires lose contact with the ground surface, promoting unsafe tipping of the vehicle, or causing damage to the fender. Ideally, a fender for a multi-use vehicle would be configurable to a first position that complies with all transportation safety requirements and a second position that does not cover the full width of the tire for driving off-road.

Further, off-road vehicles may get stuck in mud, snow, sand, or other terrain. When this occurs, it is beneficial to use a recovery board to aid in freeing the vehicle. Recovery boards are placed in front of the wheel and provide traction, allowing the vehicle to be more easily freed. However, these recovery boards can be cumbersome and use valuable space in a vehicle—especially when a trip may include gear for one or more users. Therefore, a user must often decide between taking gear for the journey or sacrificing the space and taking recovery boards. In many instances, the recovery boards must be left behind. As a result, there is a need for recovery boards that do not use valuable cargo space, that aid a user in multiple ways, and are removably attachable to a vehicle. The fender flare recovery board disclosed herein solves these, and other, problems.

SUMMARY OF EXAMPLE EMBODIMENTS

In one embodiment, a removably attachable fender flare system comprises an inner flare, an upper flare and a lower flare, which are removably attachable to the inner flare. The inner flare may be in direct contact with, and coupled to, a fender of the off-road vehicle, providing a location to secure the upper and lower flares. In one embodiment, the upper and lower flares comprise traction on the surface thereof, allowing the upper and lower flares to be used as recovery boards.

In one method of use, a user may remove an upper flare and a lower flare from a groove in an inner flare, positioning the upper flare at a base of a tire and the lower flare at a base of another tire; freeing the off-road vehicle from its stuck position; securing a lip of the upper flare in the groove of the inner flare; securing the lower flare to the upper flare by inserting the upper flare traction protrusions into the lower flare cavities; and securing a lip of the lower flare in the groove of the inner flare.

In one embodiment, a removably attachable fender flare system comprises an upper flare, lower flare, support structure that couples to a front bracket and a multi-use bracket, and an inner flare that receives the removably attachable fender flare system.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for recovery boards that do not use valuable cargo space, that aid a user in multiple ways, and are removably attachable to a vehicle. The removably attachable fender flare disclosed herein solves these, and other, problems.

Recovery boards have been used to free many vehicles that have become stuck in many environments, such as mud, snow, or sand. The removably attachable fender flares serve a dual purpose. The first purpose deals with making the off-road vehicle street legal and protecting the off-road vehicle and other drivers from debris launched from the tires. The second purpose allows the removably attachable fender flares to be used as recovery boards to free a stuck off-road vehicle. The removably attachable fender flares may quickly be attached and detached directly to an inner flare, such as by having a groove in the inner flare or brackets that are connected to the inner flare. When brackets are used, the brackets may also be able to couple to a support structure, which secures the removably attachable fender flares and provides additional support.

When an off-road vehicle has become stuck, the removably attachable fender flares may be removed from the inner flare or support structure to aid in freeing the off-road vehicle. Specifically, once the removably attachable fender flares have been removed, they can be placed under the tires to provide additional traction and a path to free the off-road vehicle. After the off-road vehicle is freed, the removably attachable fender flares may be coupled to the inner flare or the support structure. It will be appreciated that the removably attachable fender flares may be adjusted for a specific situation. For example, if the off-road vehicle is traversing a boulder and needs additional clearance, the removably attachable fender flares may be adjusted to a vertical position or removed. On the other hand, if the off-road vehicle is going to be on the highway, the removably attachable fenders may be placed at a street legal position, such as at a horizontal or flat position.

Figure 1:
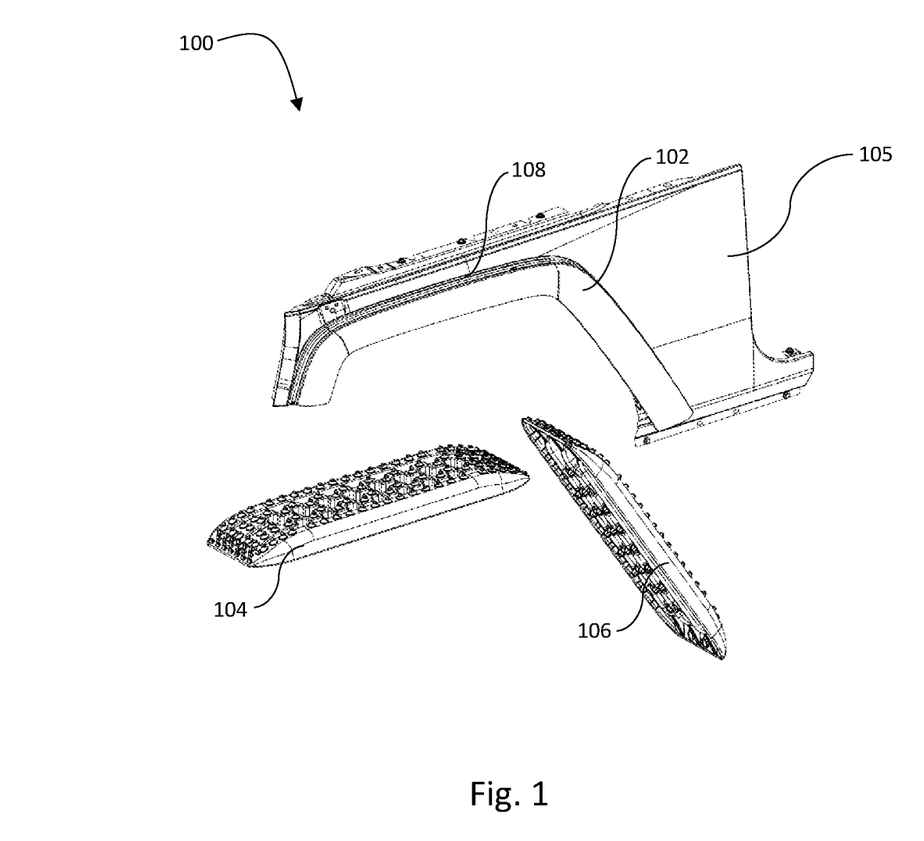
FIG. 1 illustrates an exploded view of a removably attachable fender flare system.
Figure 2:
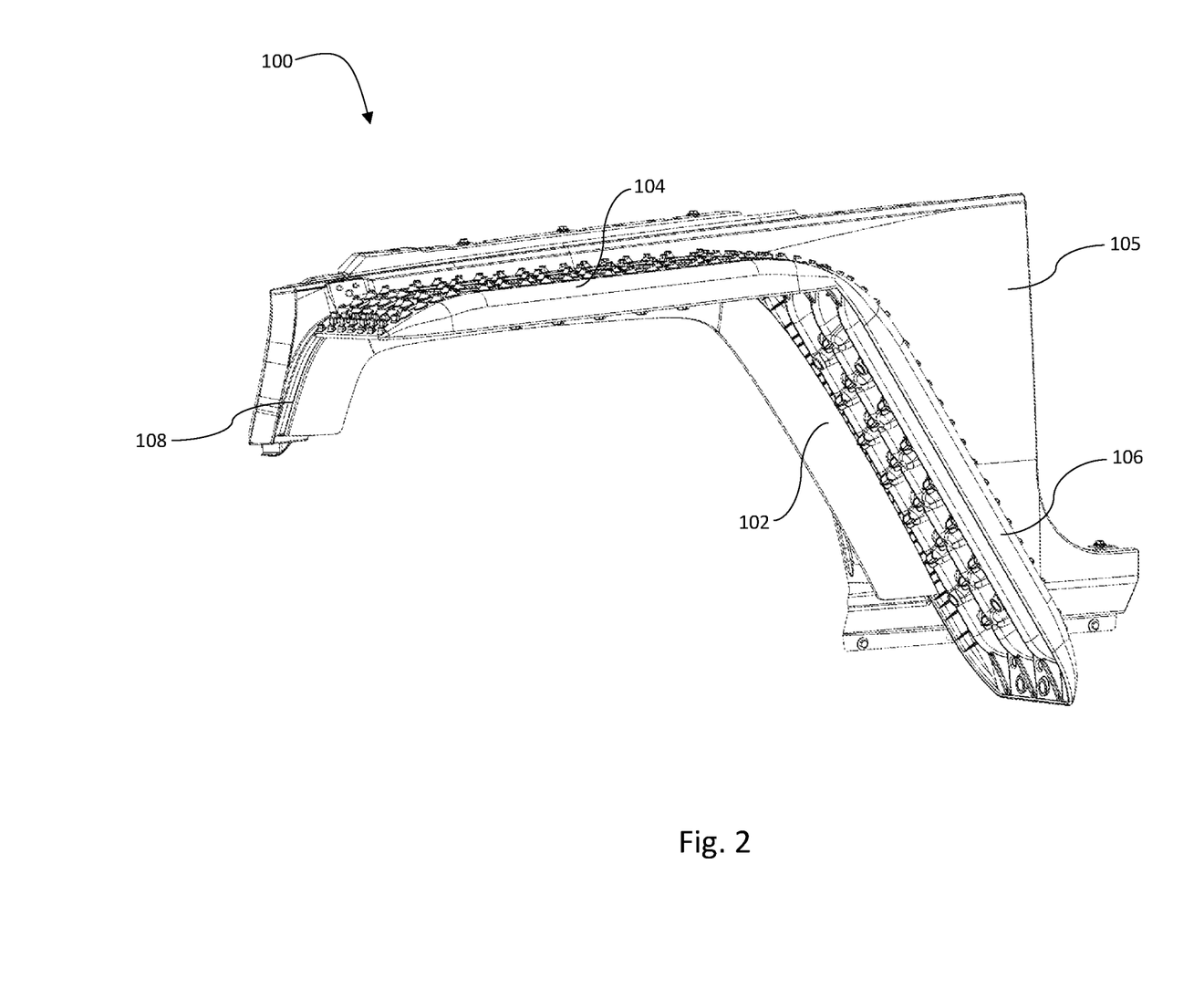
FIG. 2 illustrates a side perspective view of a removably attachable fender flare system.

In one embodiment, as shown in FIGS. 1-2, a removably attachable fender flare system 100 comprises an inner flare 102, an upper flare 104, and a lower flare 106, wherein the upper flare 104 and lower flare 106 are removably attachable to the inner flare 102. The inner flare 102 may be in direct contact with and coupled to the fender 105 of an off-road vehicle, providing a location to secure the upper and lower flares 104, 106. The inner flare 102 may be sectioned into multiple pieces so as to be attached to the off-road vehicle section by section. It could also be envisioned that the inner flare 102 may be a continuous piece of material that couples to the off-road vehicle. It may be secured to the vehicle using nuts and bolts or other suitable securing means. The inner flare 102 may comprise a securement mechanism (i.e., groove 108) that runs the entire length of the inner flare 102, from front to back. The groove 108 may act as a securement mechanism for the upper and lower flares 104, 106. Other securement mechanisms may be used, such as buckles, clips, straps, or other mechanisms that would secure the upper and lower flares 104, 106 to the inner flare 102. It will be appreciated that the inner fender 102, upper flare 104, and lower flare 106 may be made from plastic, fiber glass, carbon fiber, aluminum, titanium, or other materials that can receive the weight of a vehicle when being used as a recovery board.

Figure 3:
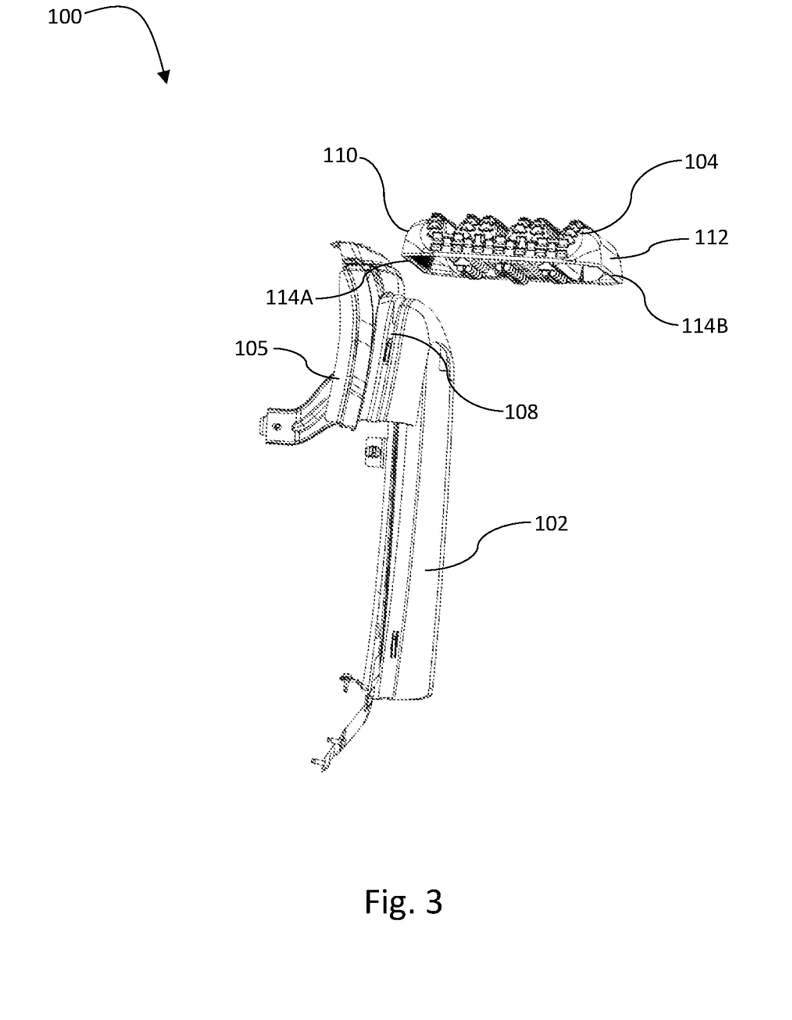
FIG. 3 illustrates a front perspective view of a removably attachable fender flare system.
Figure 4:
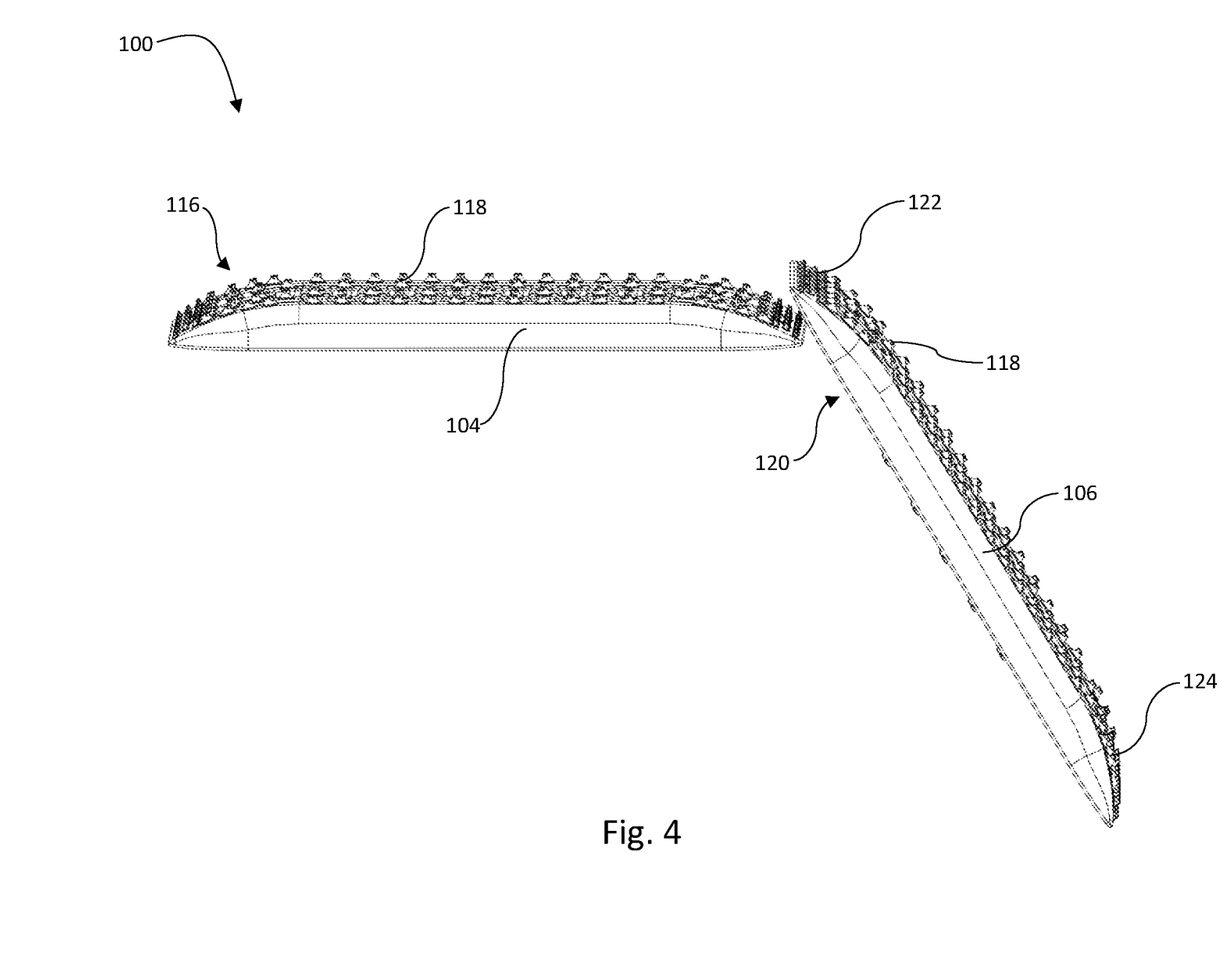
FIG. 4 illustrates a side perspective view of an upper flare and a lower flare of a removably attachable fender flare system.
Figure 5:
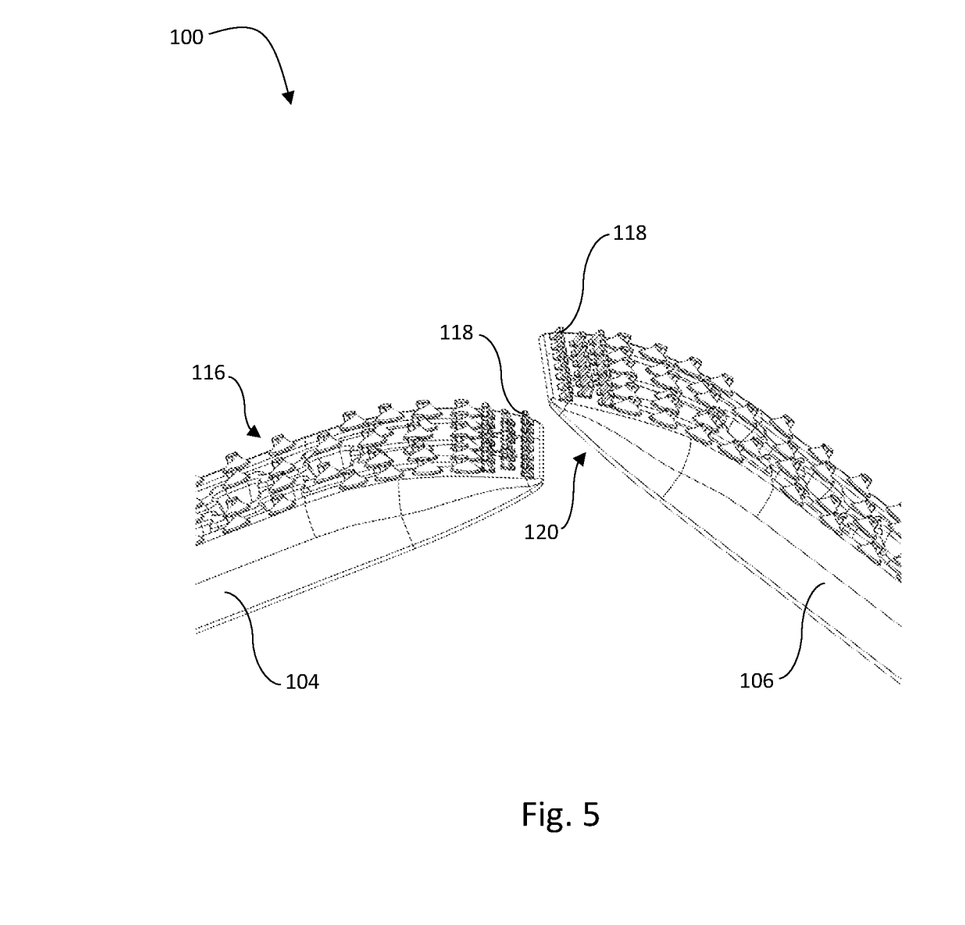
FIG. 5 illustrates an upper flare and a lower flare with a fender coupler attached thereto.

Referring to FIG. 3, a first upper flare side 110 and a second upper flare side 112 may comprise a lip 114A, 114B, respectively, that extends the length of the first and second upper flare sides 110, 112. Either lip 114A or 114B may be positioned within the groove 108, securing the upper flare 104 in a horizontal position over the off-road vehicle's tire. The lip 114 may secure the upper flare 104 via a tongue and groove, aperture and hook, or compression or tension within the groove 108. While a lip 114 may be used, it will be appreciated that other securement mechanisms may be used to secure the upper flare 104 to the inner flare 102, such as push pins, bolt and nuts, buckles, straps, etc. Further, other configurations in the art may be used, such as those disclosed in U.S. Patent Publication 2010/0253034 which is hereby incorporated in its entirety by reference.

Figure 10:
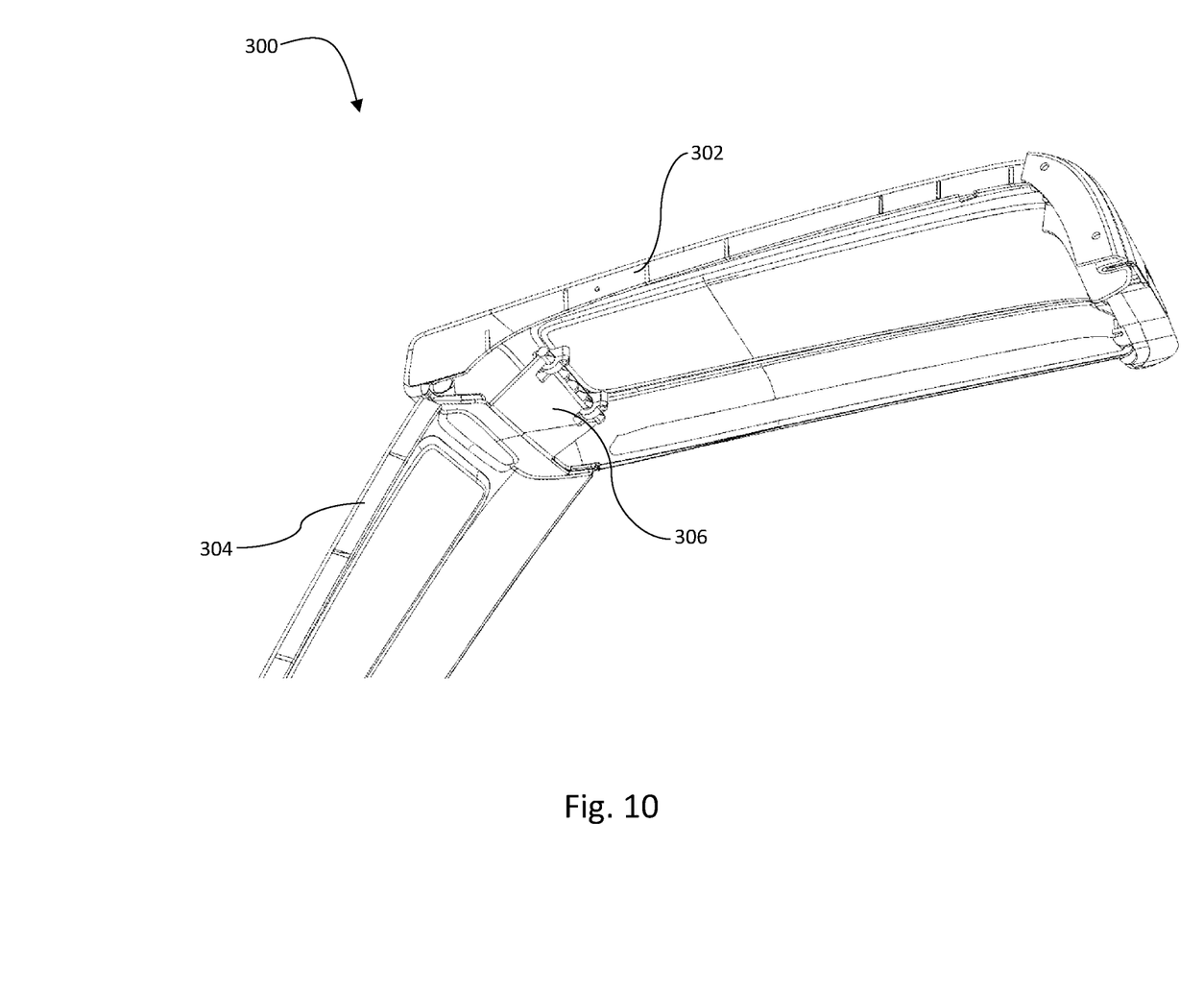
FIG. 10 illustrates a detailed, decoupled view of an upper flare and a lower flare of a removably attachable fender flare system.

Further, as shown in FIGS. 4-8, an upper surface 116 of the upper flare 104 comprises traction protrusions 118 that, when positioned under a tire, provide additional traction to propel the off-road vehicle forward. These traction protrusions 118 may also couple the upper flare 104 to the lower flare 106. For example, the upper flare traction protrusions 118 may have a specific pattern that may match the pattern of traction protrusions 118 on the lower flare 104. Specifically, a lower surface 120 of the lower flare 106, whether a front 122 or a back portion 124 of the lower flare 106, may comprise cavities (which form protrusions 118) that may receive, or nest to, the upper traction protrusions 118 so as to secure the lower flare 106 to the upper flare 104 at an angle (the protrusions 118 and their cavities are collectively referred to as "fender flare couplers"). It will be appreciated that other mechanisms may be used to secure the upper flare 104 to the lower flare 106. For example, in one embodiment, fender flare couplers may connect the upper flare 104 to the lower flare 106. It will be appreciated that the fender flare couplers may be malleable so that the upper and lower flares 104, 106 may be positioned as needed on the off-road vehicle or folded together when removed. Further, the fender flare couplers may allow folding of the upper and lower flares 104, 106, while maintaining the connection between the upper and lower flare 104, 106. In an alternate embodiment, shown in FIG. 10, the fender flare system 300 may comprise fender flare couplers comprising a hinge plate 306 so as to allow the upper flare 302 and the lower flare 304 to be foldable. Other mechanisms to couple the upper fender flares 104, 302 to lower flares 106, 304 may include, but are not limited to, bolts and nuts, hook and loop straps, rubber straps, push pins, tongue and groove, etc.

Figure 6:
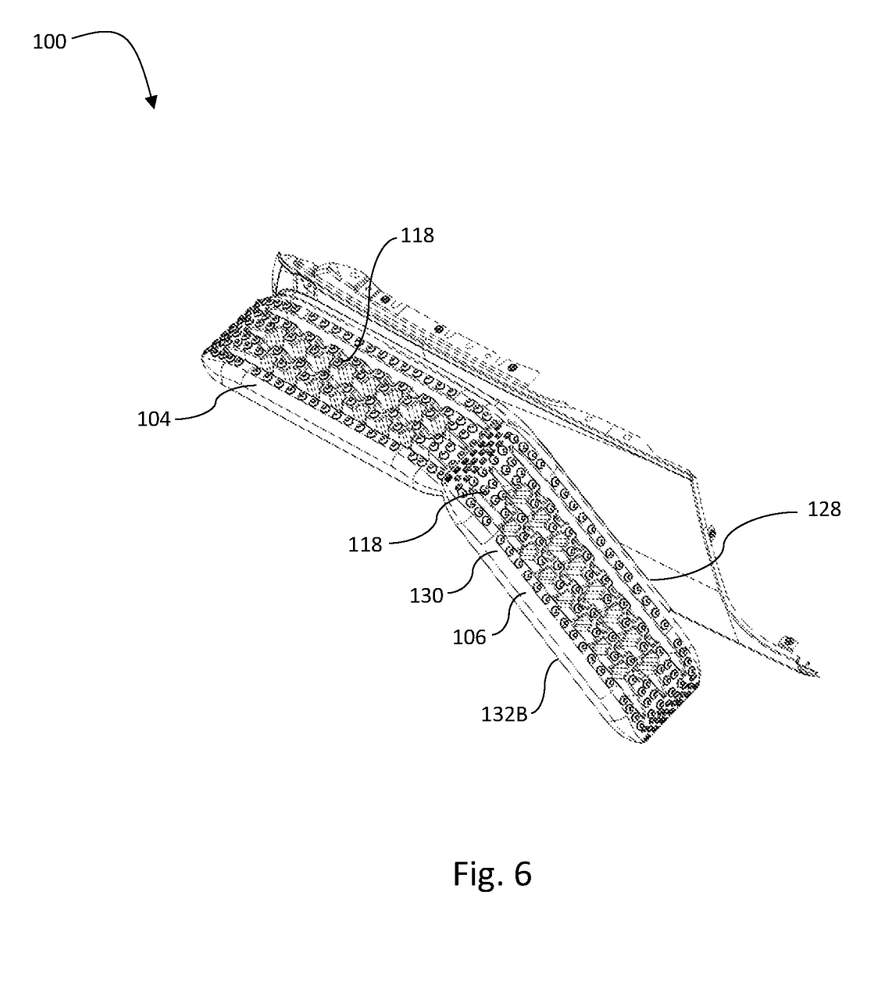
FIG. 6 illustrates a rear, top perspective view of a removably attachable fender flare system.
Figure 7:
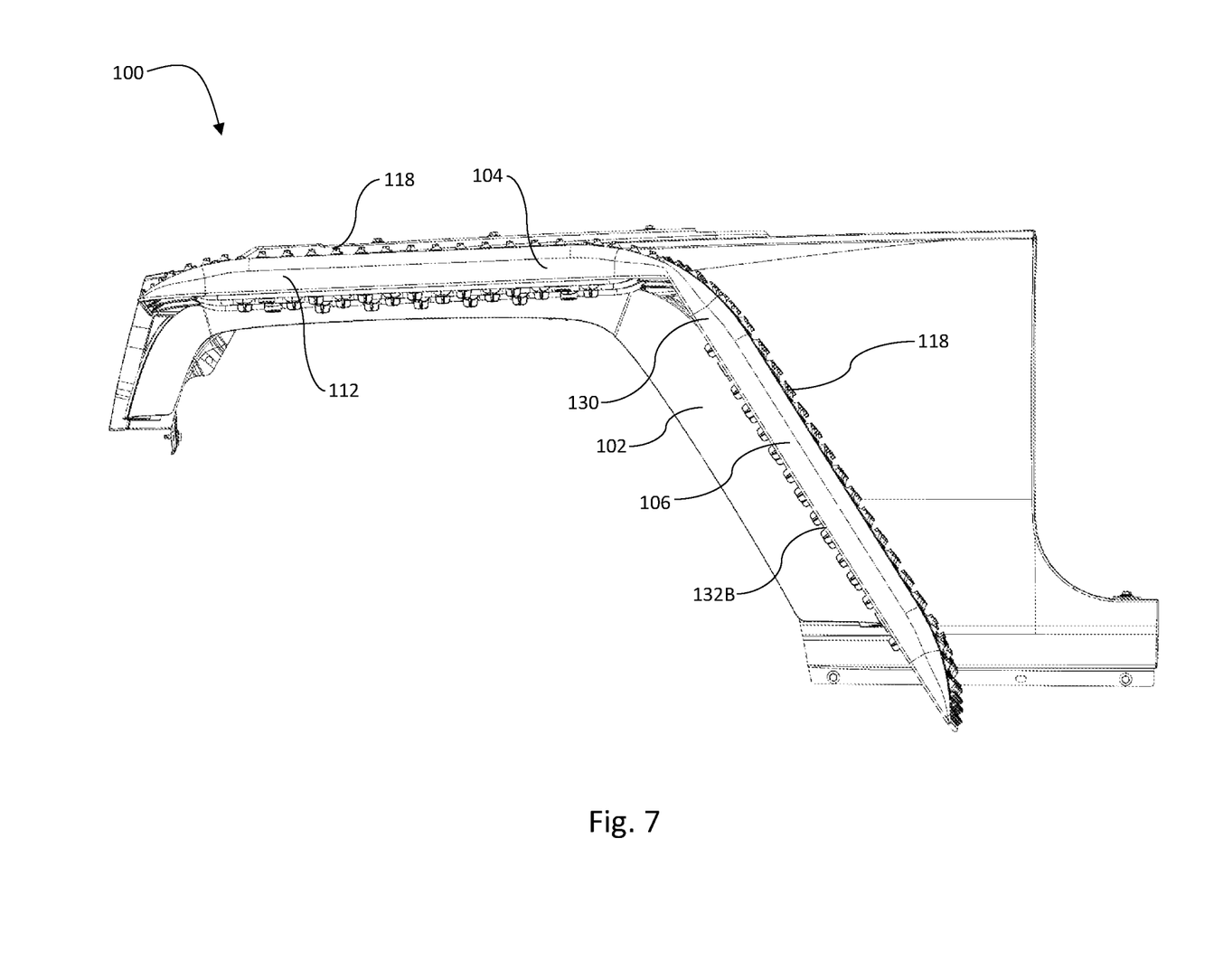
FIG. 7 illustrates a side perspective view of a removably attachable fender flare system.
Figure 8:
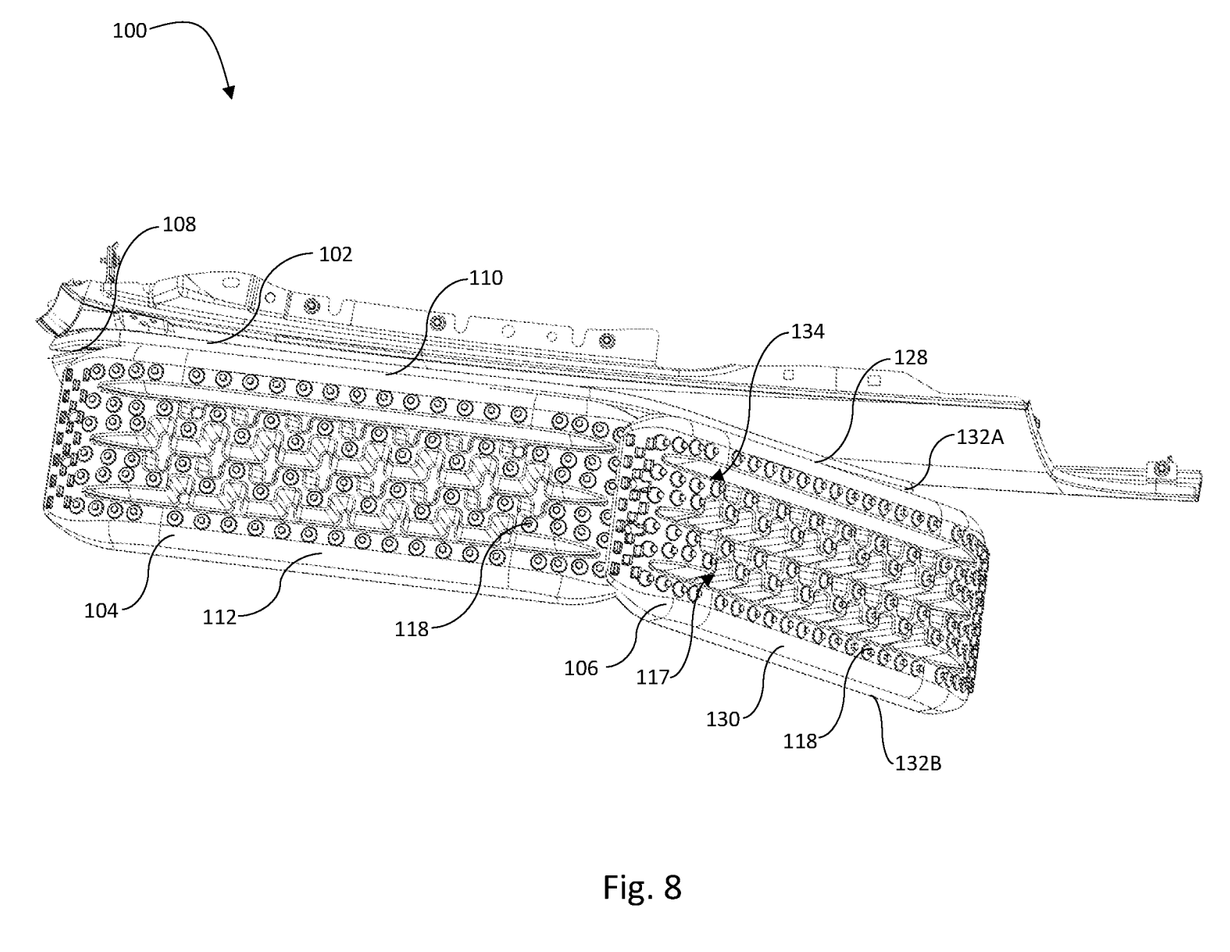
FIG. 8 illustrates a top perspective view of a removably attachable fender flare system.
Figure 9:
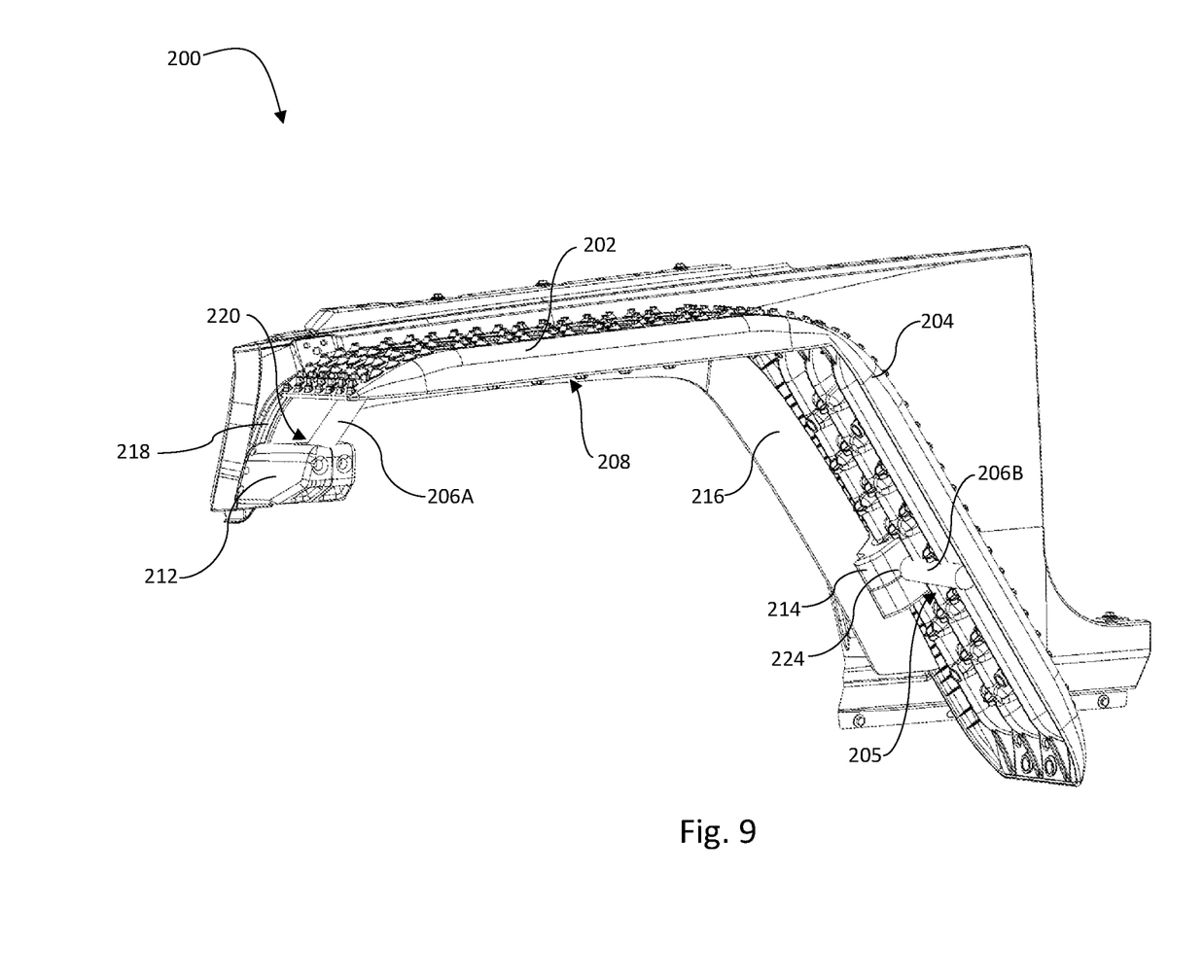
FIG. 9 illustrates a bottom, front perspective view of a removably attachable fender flare system.

The lower flare 106 may be made of the same material as the upper flare 104; however, it could be envisioned that it may be made of a different material. As shown in FIGS. 6-8, a first lower flare side 128 and a second lower flare side 130 may comprise a lip 132A, 132B that extends the length of the first and second lower flare sides 128, 130. Either lower flare side 128, 130 may be positioned within the groove 108 (shown in FIG. 3), securing the lower flare 106 in an angled position over the off-road vehicle's tire. The lip 132A may secure the lower flare 106 via a tongue and groove, aperture and hook, or compression or tension within the groove 108. It will be appreciated that an upper surface 134 of the lower flare 106 may comprise the traction aids. These traction aids may be grooves 117, protrusions 118, textures, or any combination. It will also be appreciated that either the lower flare 106 or the upper flare 104 may be a stock fender flare from the vehicle's manufacturer. In other words, it is not required that both the upper fender flare 102 and the lower flare 104 have traction aids such as traction protrusions 118. The width and lengths of the upper and lower flares 104, 106 may vary based upon the type of vehicle. For example, some off-road vehicles may require a longer and narrower upper flare, while others may need a short and wide fender flare. In one embodiment, the upper and lower flares 104, 106 may be color coded in order to differentiate between sizes of fenders, such as a blue fender is a narrow fender, while a yellow fender is a wider fender.

In one method of use, a user may remove an upper flare 104 and a lower flare 106 from a groove 108 in an inner flare 102, positioning the upper flare 104 at a base of a tire and the lower flare 106 at a base of another tire; freeing the off-road vehicle from its stuck position; securing a lip 114A of the upper flare 104 in the groove 108 of the inner flare 102; securing the lower flare 106 to the upper flare 104 by inserting traction protrusions 118 of the upper flare 104 into the lower flare cavities formed from the traction protrusions 118 of the lower flare 106; and securing a lip 132A of the lower flare 106 in the groove 108 of the inner flare 102.

Referring to FIG. 8, in one embodiment, a removably attachable fender flare system 200 comprises an upper and lower flare 202, 204 that may couple to a support arm 206A, 206B. A lower surface 208 of the upper flare 202 may comprise a channel for receiving the support structure 206. Likewise, the lower fender flare 204 may comprise a channel 205 for receiving the support arm 206B, thereby supporting the lower fender flare 204. It will be appreciated that the channel 205 may conceal the support structure 206B from a side view, although not required. Further, the support arm 206A couples to a front bracket 212 and the support arm 206B couples to a lower bracket 214. Further, the front and lower brackets 212, 214 may couple to an inner flare 216, securing the removably attachable fender flare system 200 to an off-road vehicle. The support structure 206A, 206B may be polyvinyl chloride (PVC) aluminum, steel, or any other type of material to create a rigid structure to support the upper and lower flares 202, 204. It will be appreciated that the support structure 206A, 206B may be bent and shaped to fit any size or shape of fender flare. In addition, the support structure 206A, 206B may be numerous sizes to fit a variety off-road vehicles and tire sizes. As previously discussed, the support structure 206 may receive the upper and lower flares 202, 204. In one embodiment, the support structure 206A, 206B couples to a groove 218 of the inner flare 216.

Further, the front bracket 212 secures the support structure 206A at various angles, depending on the applications. The front bracket 212 comprises a front bracket aperture 220 that can receive, for example, the support arm 206A. The front bracket aperture 220 may secure the arm 206A in multiple positions so as to change the angle of the support structure 206A and thereby the angle of the connected upper flare 202. For example, the front bracket 212 allows the upper flare 202 to be in a vertical or horizontal position, depending on the needs of the user. It will be appreciated that the front bracket 212 aperture may allow the support structure 206A to be positioned in more positions than vertical and horizontal, such as a 45-degree angle. A locking pin or similar mechanism may be used to secure the support arm 206A in the desired position. The front bracket 212 may also comprise a marker light to help identify the off-road vehicle at night or during low visibility. Further, the front bracket 212 may comprise a front groove coupler. The front groove coupler may couple to the groove 218 of the inner flare 216 by being positioned in the groove 218 and secured via a securement mechanism, such as a clamping mechanism.

As the front bracket 212 receives a portion of the support structure 206A, the lower bracket 214 may receive the support structure 206B and may be configured similar to the front bracket 212. While a single front bracket 212 and a single lower bracket 214 may be used, numerous brackets 212, 214 may be used. When numerous brackets 212, 214 are utilized, there may be additional strength to the removably attachable fender flare system 200, allowing many materials and sizes of fenders to be supported. The lower bracket 214 may comprise a groove coupler, which may couple to the inner flare 216 via a securement mechanism, such as screws, clamps, etc., similar to the front bracket 212. While the front bracket 212 may be attached in one position on the inner flare 216, the lower bracket 214 may be coupled anywhere along the groove 218 of the inner flare 216 so as to support the lower flare 204 as well as any equipment, such as a shovel. It will be appreciated that while the front bracket 212 and lower bracket 214 are used in tandem with the support arms 206A, 206B, the front and lower brackets 212, 214 may also be used without the support arm 206A, 206B and directly couple to the upper and lower flares 202, 204.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A removably attachable fender flare system for freeing an off-road vehicle, the system comprising:
   an inner flare for coupling to a fender of an off-road vehicle; the inner flare comprising a securement mechanism;
   an upper flare and a lower flare removably attachable to the securement mechanism of the inner flare; at least one of the upper or lower flare comprising traction protrusions;
   wherein the lower flare further comprises a first lower flare side and a second lower flare side, the first and second lower flare sides comprising a lip that extends the length of the of the first and second lower flare sides; and
   wherein the lip of the lower flare is couplable to the securement mechanism of the inner flare.

2. The removably attachable fender flare system of claim 1, wherein the securement mechanism is a groove that runs the entire length of the inner flare.

3. The removably attachable fender flare system of claim 1, wherein the upper flare further comprises a first upper flare side and a second upper flare side.

4. The removably attachable fender flare system of claim 3, wherein the first and second upper flare sides comprise a lip that extends the length of the first and second upper flare sides.

5. The removably attachable fender flare system of claim 4, wherein the lip of the upper flare is couplable to the securement mechanism of the inner flare.

6. The removably attachable fender flare system of claim 1, further comprising fender flare couplers.

7. The removably attachable fender flare system of claim 6, wherein the fender flare couplers are a malleable, foldable material so as to allow the upper and lower flare to be folded together.

8. A removably attachable fender flare system for freeing an off-road vehicle, the system comprising:
   an inner flare having a groove running the entire length of the inner flare, the inner flare couplable to a fender of an off-road vehicle;
   an upper flare couplable to the inner flare, the upper flare comprising:
      a first upper flare side and a second upper flare side, the first and second upper flare sides comprising a lip that extends the length of the first and second upper flare sides;
      traction protrusions on an upper surface to provide traction to the off-road vehicle when placed beneath a tire;
   a lower flare coupleable to the inner flare, the lower flare comprising;
      a first lower flare side and a second lower flare side, the first and second lower flare sides comprising a lip that extends the length of the first and second lower flare sides;
      traction protrusions on an upper surface to provide traction to the off-road vehicle when placed beneath a tire;
      a lower surface comprising cavities that receive the traction protrusions of the upper flare so as to secure the lower flare to the upper flare at an angle;
   wherein the upper flare and lower flare are removably attachable to the groove of the inner flare.

9. The removably attachable fender flare system of claim 8, wherein the lip of the upper flare is positioned in the groove of the inner flare.

10. The removably attachable fender flare system of claim 8, wherein the lip of the lower flare is positioned in the groove of the inner flare.

11. The removably attachable fender flare system of claim 8, further comprising at least one support arm.

12. The removably attachable fender flare system of claim 8, further comprising a front bracket.

13. The removably attachable fender flare system of claim 12, wherein the front bracket comprises a front bracket aperture that can receive the support arm.

14. The removably attachable fender flare system of claim 8, further comprising a lower bracket.

15. A method of freeing an off-road vehicle using a removably attachable fender flare system, the method comprising:
   removing a fender flare from a fender of an off-road vehicle;
   using the removed fender flare as a recovery board;
   once the off-road vehicle is freed, reattaching the removed fender flare to the fender of the off-road vehicle.

16. The method of claim 15, wherein the fender flare comprises traction protrusions.

* * * * *